(12) United States Patent
Imayou et al.

(10) Patent No.: US 10,173,556 B2
(45) Date of Patent: Jan. 8, 2019

(54) SEAT FOR VEHICLES (71) Applicant: TACHI-S CO., LTD., Tokyo (JP)

(72) Inventors: Kazuya Imayou, Tokyo (JP); Toshiki Igarashi, Tokyo (JP); Yayoi Hirano, Tokyo (JP); Shunsuke Yamaoka, Tokyo (JP)

(73) Assignee: TACHI-S CO., LTD., Tokyo (JP)

( * ) Notice: Subject to any disclaimer, the term of this patent is extended or adjusted under 35 U.S.C. 154(b) by 0 days.

(21) Appl. No.: 15/568,336

(22) PCT Filed: Apr. 19, 2016

(86) PCT No.: PCT/JP2016/062395
§ 371 (c)(1),
(2) Date: Oct. 20, 2017

(87) PCT Pub. No.: WO2016/171137
PCT Pub. Date: Oct. 27, 2016

(65) Prior Publication Data
US 2018/0141474 A1 May 24, 2018

(30) Foreign Application Priority Data
Apr. 23, 2015 (JP) .................................. 2015-088210

(51) Int. Cl.
B60N 2/36 (2006.01)
B60N 2/30 (2006.01)
(Continued)

(52) U.S. Cl.
CPC ............. B60N 2/3065 (2013.01); B60N 2/06 (2013.01); B60N 2/20 (2013.01); B60N 2/30 (2013.01);
(Continued)

(58) Field of Classification Search
CPC ... B60N 2/20; B60N 2/30; B60N 2/32; B60N 2/36; B60N 2/304; B60N 2/309; B60N 2/3065; B60N 2/3011; B60N 2/859
(Continued)

(56) References Cited

U.S. PATENT DOCUMENTS 4,376,552 A * 3/1983 Pilhall .................. B60N 2/3013
297/378.1 X
4,382,629 A * 5/1983 Froumajou .......... B60N 2/3013
297/334 X
(Continued)

FOREIGN PATENT DOCUMENTS

JP 2004-237922 A 8/2004
JP 2010-234938 A 10/2010
(Continued)

OTHER PUBLICATIONS

International Search Report for PCT/JP2016/062395 dated Jun. 14, 2016; English translation submitted herewith (4 pages).

Primary Examiner — Rodney B White
(74) Attorney, Agent, or Firm — Fitch, Even, Tabin & Flannery, LLP (57) ABSTRACT To provide a seat for vehicles in which a seat cushion escape mechanism can be space-saving, the seat having an escape mechanism to shift a seat cushion frame disposed on a base part from a seating posture to an escape posture with the frame placed forward of the base part includes: a support leg part having one end rotatably connected to the frame and the other end rotatably connected to the base part; a guide part to be engaged with the one end of the support leg part to guide the one end so as to lift the one end; a coil spring biasing the support leg part so as to have the one end guided by the guide part and flip up a portion connected with the frame; and a second coil spring which is provided at the (Continued)

other end and applies a biasing force so as to rotate the one end of the support leg part forward with the other end as a center.

6 Claims, 8 Drawing Sheets

(51) Int. Cl.
*B60N 2/06* (2006.01)
*B60N 2/20* (2006.01)
*B60N 2/32* (2006.01)
*B60N 2/859* (2018.01)

(52) U.S. Cl.
CPC ............ *B60N 2/304* (2013.01); *B60N 2/309* (2013.01); *B60N 2/3011* (2013.01); *B60N 2/32* (2013.01); *B60N 2/36* (2013.01); *B60N 2/859* (2018.02)

(58) Field of Classification Search
USPC .......................................... 297/331, 334, 336
See application file for complete search history.

(56) References Cited

U.S. PATENT DOCUMENTS

| | | | | |
|---|---|---|---|---|
| 4,390,205 A * | 6/1983 | Louis | ................... | B60N 2/3013 297/334 X |
| 4,475,763 A * | 10/1984 | Hamatani | ............ | B60N 2/3013 296/65.09 |
| 4,512,609 A * | 4/1985 | Parsson | ................ | B60N 2/3013 297/331 X |
| 5,641,202 A * | 6/1997 | Rus | ...................... | B60N 2/3013 297/336 X |
| 5,702,145 A * | 12/1997 | Fowler | ................. | B60N 2/3013 296/65.05 |
| 5,795,023 A * | 8/1998 | Kayumi | ............... | B60N 2/3013 297/331 |
| 5,971,467 A * | 10/1999 | Kayumi | ............... | B60N 2/0292 296/66 |
| 6,010,190 A * | 1/2000 | Downey | ................ | B60N 2/123 297/331 |
| 6,183,033 B1 * | 2/2001 | Arai | ..................... | B60N 2/3013 297/331 X |
| 6,196,613 B1 * | 3/2001 | Arai | ..................... | B60N 2/3031 297/334 X |
| 6,568,756 B2 * | 5/2003 | Sugimoto | ............ | B60N 2/3011 297/334 X |
| 6,598,926 B1 * | 7/2003 | Price | ........................ | B60N 2/06 297/334 X |
| 6,655,738 B2 * | 12/2003 | Kammerer | ........... | B60N 2/0292 297/331 X |
| 6,676,216 B1 * | 1/2004 | Freijy | .................. | B60N 2/3013 297/335 X |
| 6,702,355 B1 * | 3/2004 | Price | ...................... | B60R 5/045 297/334 X |
| 6,899,392 B1 * | 5/2005 | Saberan | ................. | B60N 2/206 297/334 X |
| 7,246,857 B2 * | 7/2007 | Kim | ..................... | B60N 2/3065 297/331 |
| 7,300,107 B2 * | 11/2007 | Kammerer | ........... | B60N 2/0292 297/334 X |
| 7,413,251 B2 * | 8/2008 | Link | .................... | B60N 2/0705 297/334 |
| 8,474,910 B2 * | 7/2013 | Kammerer | ............... | B60N 2/12 297/334 X |
| 8,845,026 B2 * | 9/2014 | Kobayashi | ........... | B60N 2/3013 297/334 X |
| 9,216,671 B2 | 12/2015 | Watanabe | | |
| 2004/0104590 A1 * | 6/2004 | Kikuchi | ............. | B60N 2/01583 296/65.03 |
| 2006/0152030 A1 * | 7/2006 | Van Dyk | ............... | B60N 2/3031 296/65.09 |
| 2015/0115680 A1 * | 4/2015 | Mabashi | ................. | B60N 2/06 297/334 |
| 2015/0375643 A1 * | 12/2015 | Fisher | .................... | B60N 2/015 297/334 |

FOREIGN PATENT DOCUMENTS

| | | |
|---|---|---|
| JP | 2012-214131 A | 11/2012 |
| JP | 2013-082386 A | 5/2013 |
| JP | 2013-154728 A | 8/2013 |

* cited by examiner

SEAT FOR VEHICLES

CROSS-REFERENCE TO RELATED APPLICATIONS

This application is a U.S. national phase application filed under 35 U.S.C. § 371 of International Application No. PCT/JP2016/062395, filed Apr. 19, 2016, designating the United States, which claims priority from Japanese Patent Application No. 2015-088210, filed Apr. 23, 2015, which are hereby incorporated herein by reference in their entirety.

TECHNICAL FIELD

The present invention relates to a seat for vehicles which is used in a vehicle.

BACKGROUND ART

Japanese Patent Application Laid-Open No. 2013-82386 (PTL 1) describes a seat for vehicles which includes a walk-in mechanism and a mechanism for recovery from walk-in operation, and a walk-in cancel mechanism and a walk-in cancel release mechanism. Next, each of the mechanisms will be described.

(1) The walk-in mechanism is a mechanism which restrains a seat back from rotating to a fully tilted-down position of the seat back and switches a slide lock mechanism in a locked state to an unlocked state when, by operating a walk-in operation means to rotate the seat back forward, the seat back is rotated to a middle tilted position between an upright position in which the seat back is roughly perpendicular to a base member and the fully tilted-down position in which the seat back tilts down and covers an upper surface of the base member.

As main components of the walk-in mechanism, a pressing projection located at the lower end of a seat back frame and a walk-in operation lever are provided. As the seat back is rotated forward by operating the walk-in operation means, the pressing projection presses the walk-in operation lever and rotates it to a walk-in operation position. At this time, the pressing projection is restrained from rotating by a non-pressing projection and the seat back stops rotating at the middle tilted position. On the other hand, as the walk-in operation lever is rotated to the walk-in operation position, a lock claw for fixing an upper rail onto a lower rail is rotated to an unlocked position. Then, the upper rail becomes slidable with respect to the lower rail (see Paragraph 0019).

(2) The mechanism for recovery from walk-in operation is a mechanism which, by returning the seat back from the middle tilted position to the upright position, switches the slide lock mechanism from the unlocked state to the locked state and restrains the upper rail from sliding with respect to the lower rail.

This mechanism releases the pressing force of the pressing projection against the walk-in operation lever and switches the lock claw from the unlocked state to the locked state. At this time, the walk-in operation lever is rotated and reset to a walk-in non-operation position (see Paragraph 0019).

(3) The walk-in cancel mechanism is a mechanism which functions by rotating a seat cushion in a position which allows sitting, to the escape position and allows the seat back to rotate to the fully tilted-down position with the seat cushion in the escape position, while setting the walk-in mechanism to an invalid state in which the walk-in mechanism is inoperable.

The walk-in cancel mechanism is a mechanism which enables the seat back to rotate to the fully tilted-down position by operating the cancel operation lever when the walk-in operation means is operated with the seat cushion rotated to the escape position, and also keeps the locked state (sliding restrained) of the upper rail with respect to the lower rail. The walk-in cancel mechanism sets the walk-in operation lever to a walk-in non-operation position (position where no interference with the pressing projection occurs) by rotating the seat cushion to the escape position and rotating the seat back to the fully tilted-down position. This keeps the locked state (sliding restrained) of the upper rail with respect to the lower rail. In other words, the walk-in cancel mechanism cancels walk-in operation.

(4) The walk-in cancel release mechanism is a mechanism which functions by rotating the seat back in the fully tilted-down position to the upright position and then returning the seat cushion to the position which allows sitting, and resets the walk-in mechanism invalidated by the walk-in cancel mechanism, to a valid state in which the walk-in cancel mechanism is operable.

The above walk-in cancel mechanism is provided in relation to a retracted posture of the vehicle seat in which the seat cushion is rotated to the escape position and also the seat back is rotated to the fully tilted-down position.

Japanese Patent Application Laid-Open No. 2012-214131 (PTL 2) describes a flip-up mechanism which sets a vehicle seat to a retracted posture. This flip-up mechanism turns a link forward by the biasing force of a spiral spring to flip up the seat cushion (see Paragraph 0089).

CITATION LIST

Patent Literature

PTL 1: Japanese Patent Application Laid-Open No. 2013-82386
PTL 2: Japanese Patent Application Laid-Open No. 2012-214131

SUMMARY OF INVENTION

Technical Problem

In the flip-up mechanism described in PTL 2, the spiral spring is used to turn the link forward, so it is difficult to make the escape mechanism with the spiral spring space-saving. Furthermore, the spiral spring is located in a small space near a rotation shaft and an experience is needed in assembling work.

An object of the present invention is to provide a seat for vehicles in which a seat cushion escape mechanism can be space-saving and assembling work for the escape mechanism is easy.

Solution to Problem

In order to achieve the above object, according to the present invention, there is provided a seat for vehicles which has an escape mechanism to shift a seat cushion disposed on a base part from a normal seating posture through a flipped-up posture to an escape posture with the seat cushion placed forward of the base part. The escape mechanism includes:

a support leg part having one end connected to a frame of the seat cushion rotatably around a first rotation shaft and another end connected to the base part rotatably around a second rotation shaft;

a guide part to be engaged with the one end of the support leg part to guide the one end so as to lift the one end;

a coil spring applying a biasing force so as to have the one end guided by the guide part and flip up a portion connected with the frame; and a second coil spring provided on the second rotation shaft to apply a biasing force so as to rotate the one end of the support leg part forward around the second rotation shaft.

Advantageous Effects of Invention

According to the present invention, it is possible to provide a seat for vehicles in which a seat cushion escape mechanism can be space-saving and assembling work for the escape mechanism is easy.

DESCRIPTION OF EMBODIMENTS

Next, embodiments of the present invention will be described. In the description below, "longitudinal direction" means the front-back direction of a vehicle; "width direction" means the width direction of the vehicle or vehicle seat (same direction for both); "left-right direction" means the left-right direction as seen ahead of the vehicle; and "up-down direction" means the vertical direction with the vehicle placed in a horizontal position. The left-right direction is the same direction as the width direction of the vehicle or vehicle seat. In the figures, sign F indicates that the direction of arrow is forward of the vehicle and sign R indicates that the direction of arrow is rearward of the vehicle.

A vehicle seat 1 in the present embodiment includes a walk-in mechanism and a mechanism for recovery from walk-in operation, and a walk-in cancel mechanism and a walk-in cancel release mechanism that are the same as those in the above PTL 1. Next, an explanation will be given referring to drawings.

Figure 1:
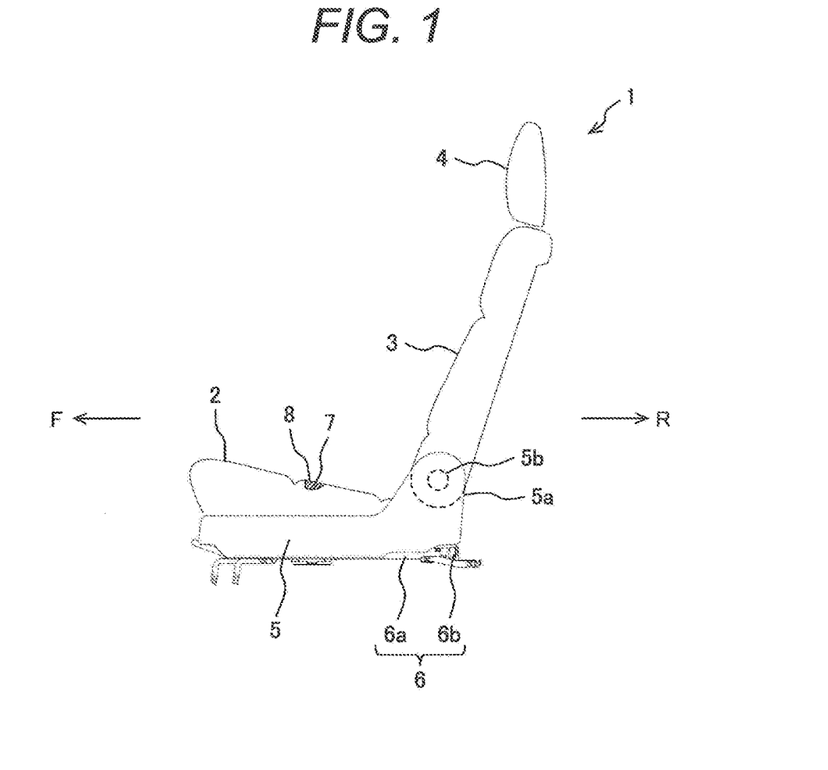
FIG. 1 is a perspective view of a vehicle seat 1 according to an embodiment of the present invention.

FIG. 1 is a side view of the vehicle seat 1 according to an embodiment of the present invention. FIG. 1 shows that the vehicle seat 1 is in a normal seating posture which permits a passenger to get seated.

As shown in FIG. 1, the vehicle seat 1 includes a metal base member 5, a seat cushion 2 on which a human being sits, a seat back 3 erected upright at the rear end of the seat cushion, and a head rest 4 provided at the top of the seat back 3.

The base member 5 is attached to a floor surface in the vehicle through a slide rail device 6 in a longitudinally slidable manner. The slide rail device 6 has a lower rail 6a and an upper rail 6b and is structured so that the upper rail 6b can slide with respect to the lower rail 6a. The lower rail 6a is fixed onto the floor surface in the vehicle. The upper rail 6b is attached to the base member 5 and fixed.

The slide rail device 6 includes a slide lock mechanism which fixes the upper rail 6b onto the lower rail 6a. PTL 1 describes a slide lock mechanism which includes a lock hole which is provided in the lower rail and a lock claw which is provided in the upper rail and can rotate around a shaft extending in the longitudinal direction. In the present embodiment, a slide lock mechanism which is structured in the same manner as in PTL 1 may be used.

At the rear end portion of the base member 5, connecting parts 5a protruding upward are integrally formed. The connecting parts 5a are provided as a pair of left and right ones. A rotation shaft 5b extending left and right is provided between the paired left and right connecting parts 5a. The lower end portion of the frame of the seat back 3 is rotatably connected to both ends of the rotation shaft 5b.

The seat cushion 2 covers the area around the after-mentioned seat cushion frame with a cushion material 7 and further covers it with an epidermis material 8 from above. The areas around the respective frames of the seat back 3 and the head rest 4 are covered with the cushion material 7 and further covered with the epidermis material 8 from above.

Figure 13:
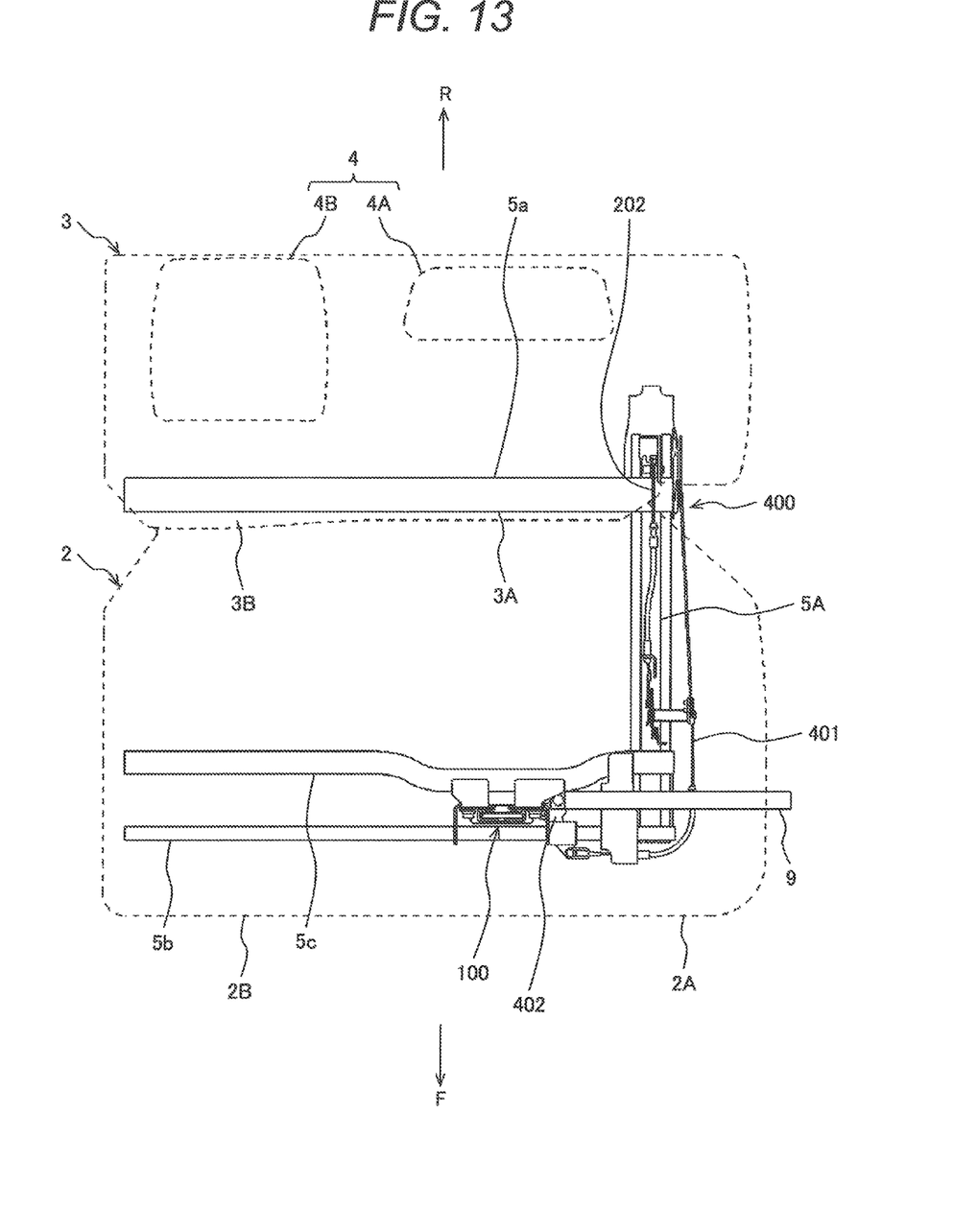
FIG. 13 is a view which illustrates a walk-in cancel mechanism of the vehicle seat 1 according to an embodiment of the present invention.

In the present embodiment, the seat as shown in FIG. 13 is described as the vehicle seat 1. FIG. 13 is a plan view of the seat 1 as seen from above, in which the external appearance of the vehicle seat 1 is indicated by dotted lines.

The vehicle seat 1 constitutes a backseat (second row or more rearward seat) in a vehicle having a cargo room space at the rear of the vehicle body. Particularly the vehicle seat 1 is suitable to be mounted in a station wagon type vehicle. However, vehicle seats to which the present invention can be applied are not limited to backseats in vehicles having a cargo room space and backseats in station wagons.

In the vehicle seat 1 in the present embodiment, a left seat having a left seat cushion 2A, a left seat back 3A, and a left head rest 4A and a right seat having a right seat cushion 2B, a right seat back 3B, and a right head rest 4B are integrated.

Next, switching of the posture of the vehicle seat 1 will be described.

Figure 2:
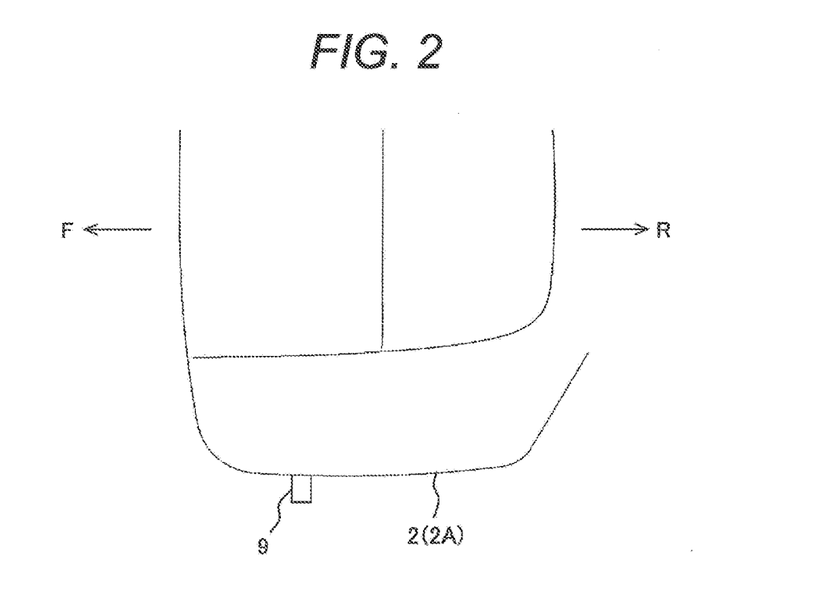
FIG. 2 is an enlarged plan view which shows a lateral portion of the vehicle seat 1 in enlarged form.

FIG. 2 is an enlarged plan view which shows a lateral portion of the vehicle seat 1 in enlarged form. FIG. 2 shows a left side portion of the vehicle seat.

An operation part 9 for unlocking the seat cushion 2 is drawn from under the seat cushion 2 of the vehicle seat 1. The operation part 7 is an operation strap which is a belt-like member.

As a mechanism for locking the seat cushion 2, for example, a mechanism as described in PTL 1 may be used. Specifically, a striker is attached to the seat cushion 2, a lock piece which can swing toward the base member is provided, and the striker and the lock piece are engaged to lock the seat cushion 2. By pulling the operation part 7 to swing the lock piece, the striker and the lock piece are disengaged.

Figure 3:
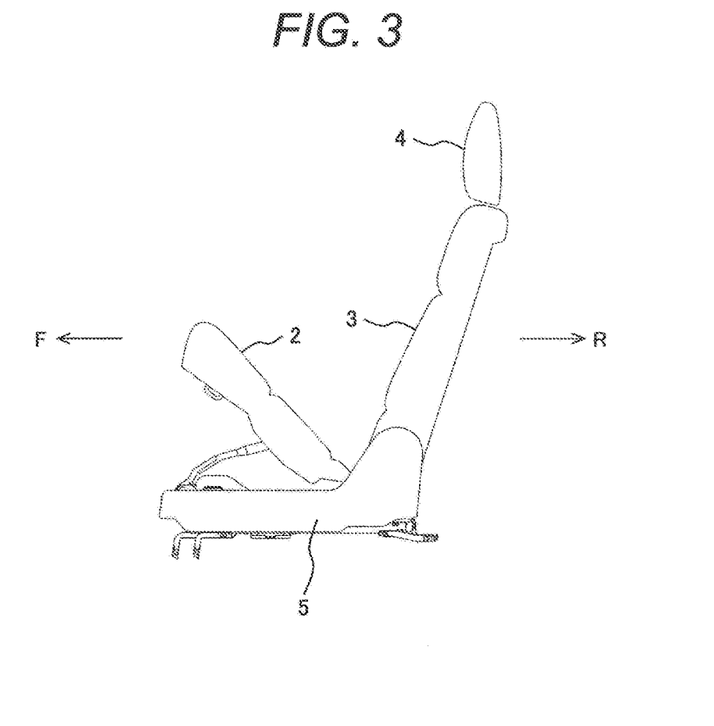
FIG. 3 is a side view which shows a flipped-up posture of a seat cushion 2 flipped up from a base member 5 in the vehicle seat 1 according to an embodiment of the present invention.
Figure 4:
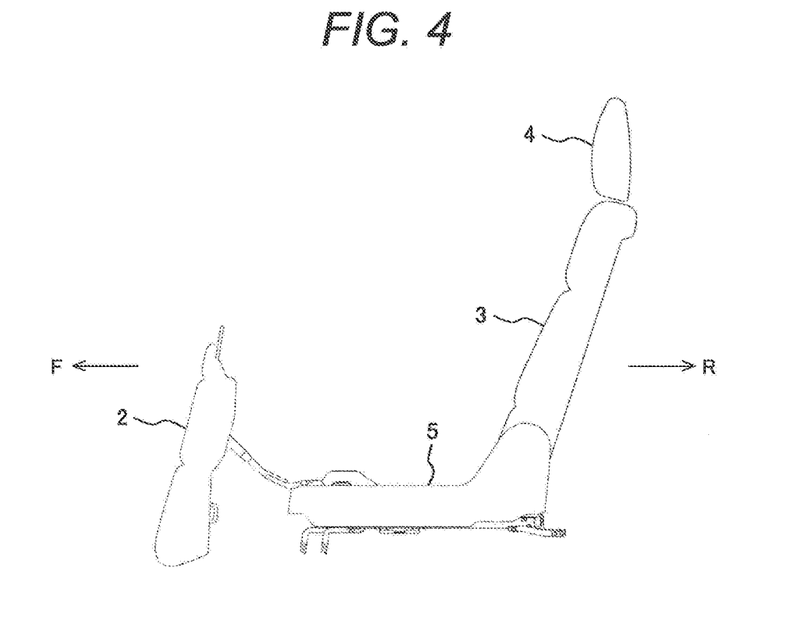
FIG. 4 is a side view which shows an escape posture of the seat cushion 2 set to an escape position in the vehicle seat 1 according to an embodiment of the present invention.
Figure 5:
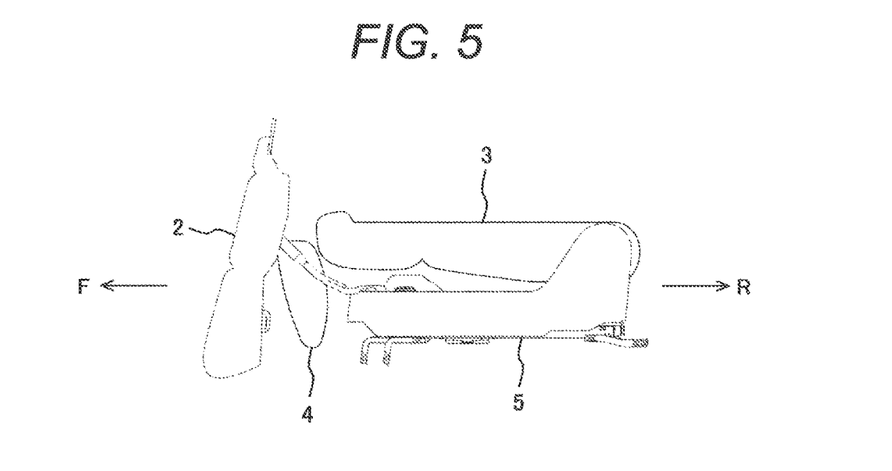
FIG. 5 is a side view which shows a retracted posture in which the seat cushion 2 is set to the escape position and a seat back 3 is fully tilted down over the base member 5 in the vehicle seat 1 according to an embodiment of the present invention.

The vehicle seat 1 can be switched from the seating posture shown in FIG. 1 to the postures shown in FIGS. 3 to 5. FIG. 3 is a side view which shows the flipped-up posture of the seat cushion 2 flipped up from the base member 5 in the vehicle seat 1 according to an embodiment of the present invention. FIG. 4 is a side view which shows the escape posture of the seat cushion 2 set to the escape position in the vehicle seat 1 according to an embodiment of the present invention. FIG. 5 is a side view which shows the retracted posture in which the seat cushion 2 is set to the escape position and the seat back 3 is fully tilted down over the base member 5 in the vehicle seat 1 according to an embodiment of the present invention.

In the seating posture (position which allows sitting) shown in FIG. 1, the seat cushion 2 is set to a normal position in which a passenger can get seated, with respect to the base member 5. Also, the seat back 3 is in an upright position erected from the base member 5 with an angle of approximately 90 degrees or more. In the seating posture, the seat cushion 2 is locked onto the base member 5 and the tilting angle of the seat back 3 in the longitudinal direction is fixed.

When the operation part 9 is operated in the seating posture shown in FIG. 1, the seat cushion 2 is shifted to the flipped-up posture (flipped-up position) shown in FIG. 3. In the flipped-up posture, the seat cushion 2 is unlocked from the base member 5 and the seat cushion 2 is flipped up from the base member 5. In this state, the front side of the seat cushion 2 is lifted and the rear side of the seat cushion 2 is lower than the front side. In other words, the front side of the seat cushion 2 is in a higher position than the rear side.

When the seat cushion 2 assumes this flipped-up posture, switching to the next escape posture is easy. However, in the present embodiment, shift from the flipped-up posture in FIG. 3 to the escape posture (escape position) in FIG. 4 is continuously performed. Triggered by operation of the operation part 9, shift from the flipped-up posture in FIG. 3 to the escape posture in FIG. 4 is automatically performed without a break after shift from the seating posture in FIG. 1 to the flipped-up posture in FIG. 3.

In the escape posture in FIG. 4, the seat cushion 2 is set to the escape position in front of the base member 5. At this time, the seat cushion 2 stands still with the front side (front edge) in contact with the vehicle floor surface and the rear side lifted up. In addition, the seat cushion 2 is in an upright state in which the seating surface faces forward and the back of the seating surface faces toward the gazette.

In the escape posture in FIG. 4, the head rest 4 is tilted down forward and the seat back 3 is tilted down to the fully tilted-down position in a manner to cover the upper surface of the base member 5 from which the seat cushion 2 has been moved away. Consequently, the vehicle seat 1 is shifted to the retracted posture (retracted position) in FIG. 5.

Next, the flip-up mechanism 300 which changes the seating posture in FIG. 1 to the flipped-up posture in FIG. 3 will be described referring to FIGS. 6 to 9.

Figure 6:
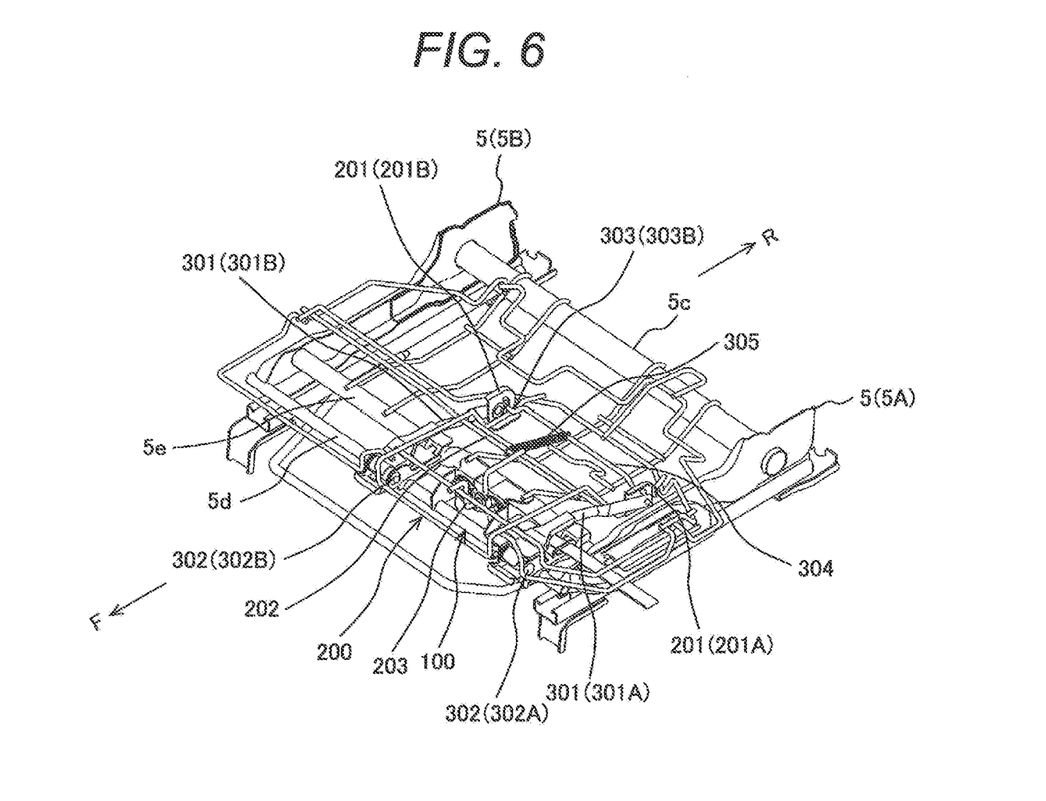
FIG. 6 is a perspective view which shows the structure of the base part 5 and the structure of a frame 200 of the seat cushion 2 as seen from above in the vehicle seat 1 according to an embodiment of the present invention.
Figure 7:
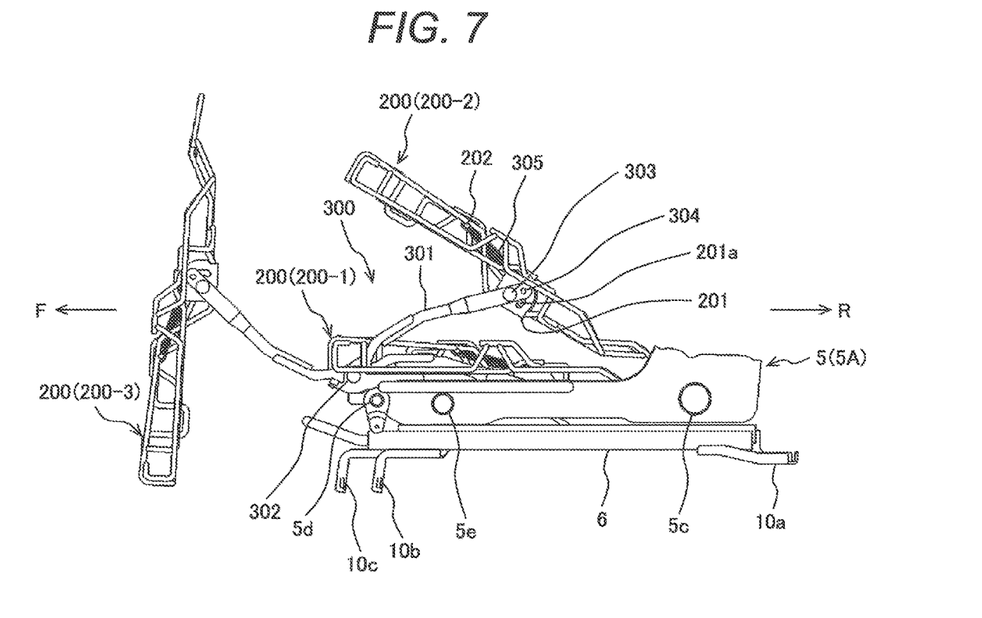
FIG. 7 is a side view which shows the structure of the base part 5 and the structure of the frame 200 of the seat cushion 2 in the vehicle seat 1 according to an embodiment of the present invention.
Figure 8:
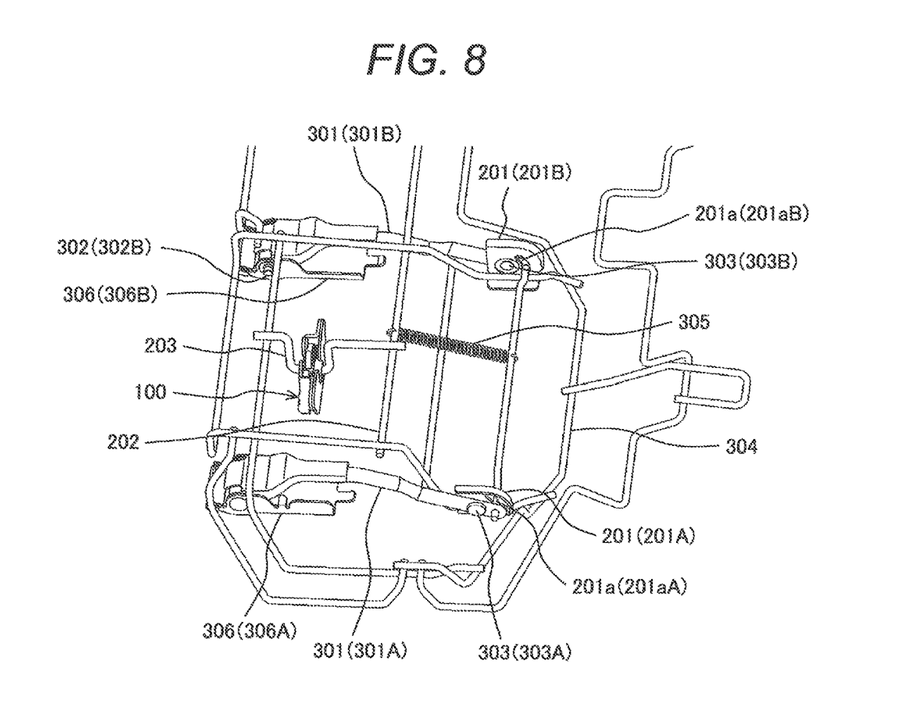
FIG. 8 is a perspective view which shows the vicinity of a flip-up mechanism 300 in enlarged form.
Figure 9:
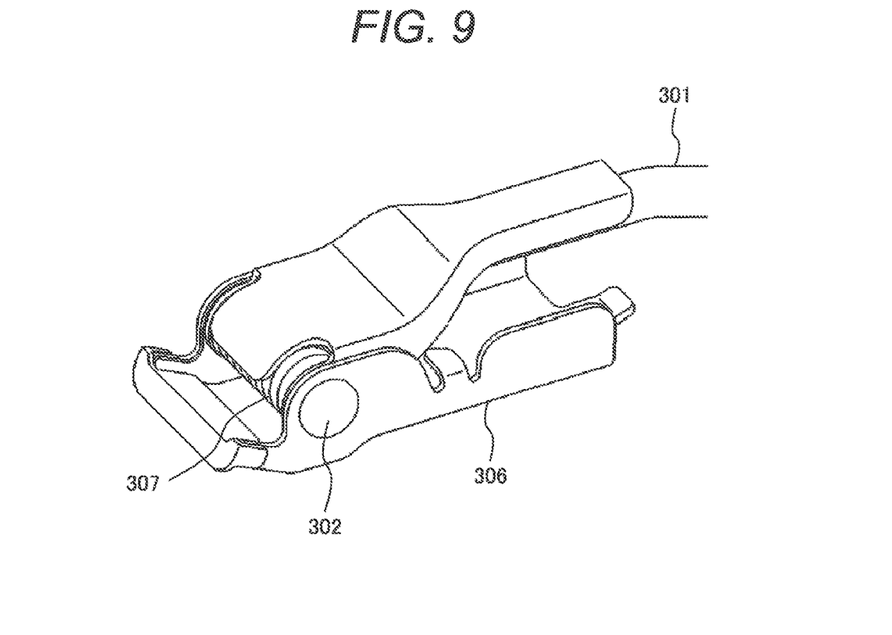
FIG. 9 is a perspective view which shows the vicinity of a hinge part 306 for fixing a support leg part 301 of the flip-up mechanism 300 onto the base part 5 in enlarged form.

FIG. 6 is a perspective view which shows the structure of the base part 5 and the structure of the frame 200 of the seat cushion 2 as seen from above in the vehicle seat 1 according to an embodiment of the present invention. FIG. 7 is a side view which shows the structure of the base part 5 and the structure of the frame 200 of the seat cushion 2 in the vehicle seat 1 according to an embodiment of the present invention. FIG. 8 is a perspective view which shows the vicinity of the flip-up mechanism 300 in enlarged form. FIG. 9 is a perspective view which shows the vicinity of a hinge part 306 for fixing a support leg part 301 of the flip-up mechanism 300 onto the base part 5 in enlarged form. In FIG. 6, the frame in the seating posture 200-1, the frame in the flipped-up posture 200-2, and the frame in the escape posture 200-3 are shown in a single drawing.

The base part 5 includes a left base member 5A and a right base member 5B. The left base member 5A and the right base member 5B are connected by connecting members 5a, 5b, and 5c. The left base member 5A and the right base member 5B are formed as metal plate members. The connecting members 5a, 5b, and 5c are formed as metal cylindrical members or metal round bars. The base part 5 is fixed onto the vehicle floor surface by brackets 10a, 10b, 10c, etc.

The flip-up mechanism 300 is located between the frame 200 of the seat cushion 2 and the base part 5 (see FIG. 7). A connecting member (connecting plate) 201 to which the support leg part 301 of the flip-up mechanism 300 is connected is fixed onto the frame 200. One end of the support leg part 301 is rotatably connected to the base part 5 through the rotation shaft 302 provided in the hinge part (bracket part) 306 (see FIG. 9). The other end of the support leg part 301 is rotatably connected to the connecting member 201 through a rotation shaft 303. The connecting member 201 is one of the constituent elements of the flip-up mechanism 300.

The rotation shaft 303 is located in a middle portion of the frame 200 in the longitudinal direction and the rotation shaft 302 is located at the front end of the frame 200 (base part 5).

The support leg parts 301, connecting members 201, and hinge parts 306 and so on are respectively disposed on the left and right sides in pairs. Hereinafter, in the figures, components located on the left side are designated by the respective reference signs accompanied by A and components located on the right side are designated by the respective reference signs accompanied by B.

In the connecting member 201, a guide groove 201a having a fixed radius with the rotation shaft 303 as the center is formed. A guided member (guided frame member) 304 to be engaged with the guide groove 201a and guided is provided nearer to the tip than the rotation shaft 303 of the support leg part 301 (see FIG. 7).

An elastic member 305 is provided between a frame member 202 constituting the frame 200 and the guided member 304 to bias the guided member 304 toward the frame member 202. The elastic member 305 is a coil spring which is located under the seating surface on which a passenger sits. In other words, the elastic member 305 is placed in a space surrounded by the cushion material 7 of the seat cushion 2.

As shown in FIG. 9, in the hinge part 306, a coil spring 307 is provided on the rotation shaft 302. The coil spring 307 biases the support leg part 301 so as to shift it from the seating posture 200-1 to the flipped-up posture 200-2 and further to the escape posture 200-3.

In the seating posture, the frame 200 of the seat cushion 2 is locked by the seat cushion lock mechanism 100 so as to be kept in the seating posture. The seat cushion lock mechanism 100 has a swingable lock piece and the frame 200 is locked so as to be kept in the seating posture by engagement of the lock piece with a striker 203 provided in the frame 200. This seat cushion lock mechanism 100 can be structured in the same manner as in PTL 1.

Next, how the flip-up mechanism 300 operates will be described.

As the operation part 9 is operated, the lock piece of the seat cushion lock mechanism 100 swings and is disengaged from the striker 203. As the lock piece and the striker 203 are disengaged, the guided member 304 of the support leg part 301 receives the biasing force of the elastic member 305 and the guided member 304 is guided by the guide groove 201a to move to the upper end of the guide groove 201a. With this motion of the support leg part 301, the frame 200 is switched from the seating posture 200-1 to the flipped-up posture 200-2.

When the frame 200 is switched from the seating posture 200-1 to the flipped-up posture 200-2, the frame 200 receives not only the biasing force of the elastic member 305 but also the biasing force of the coil spring 307 of the hinge part 306. Specifically, in the present embodiment, the frame 200 is switched from the seating posture 200-1 to the flipped-up posture 200-2 by the biasing force of the elastic member 305 and the biasing force of the coil spring 307.

Switching of the frame 200 from the seating posture 200-1 to the flipped-up posture 200-2 can be performed only by the biasing force of the elastic member 305. Once the seat cushion 2 has been shifted to the flipped-up posture, the seat cushion 2 can be shifted from the flipped-up posture 200-2 to the escape posture 200-3 easily even by hand, as mentioned above.

Next, the escape mechanism which switches the seat cushion 2 from the flipped-up posture in FIG. 3 to the escape posture in FIG. 4 will be described.

In the escape mechanism for the seat cushion 2, the coil spring 307 of the hinge part 306 and the support leg 301 are main components. The coil spring 307 supports switching of the frame 200 of the seat cushion 2 from the seating posture 200-1 to the flipped-up posture 200-2. After the frame 200 of the seat cushion 2 is switched from the seating posture 200-1 to the flipped-up posture 200-2, the biasing force of the coil spring 307 plays a central role in switching the frame 200 of the seat cushion 2 from the flipped-up posture 200-2 to the escape posture 200-3.

The escape mechanism for the seat cushion 2 switches the seat cushion 2 from the flipped-up posture 200-2 to the escape posture 200-3 after the flip-up mechanism 300 switches the seat cushion 2 from the seating posture 200-1 to the flipped-up posture 200-2. In short, escape operation by the escape mechanism takes place following the flip-up operation by the flip-up mechanism 300. Therefore, the flip-up mechanism 300 may be included in the escape mechanism and the escape operation by the escape mechanism may be considered to be included in a series of operations from the seating posture 200-1 through the flipped-up posture 200-2 to the escape posture 200-3.

Figure 10:
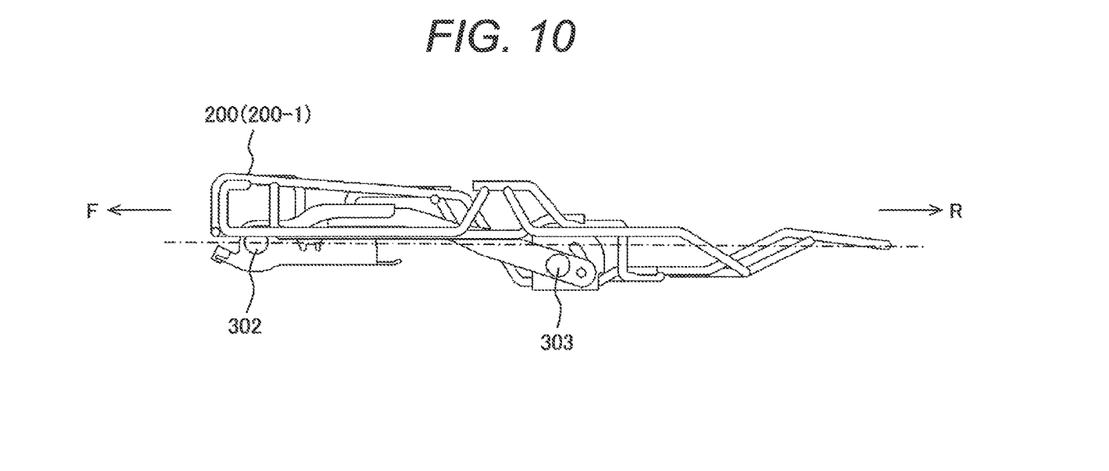
FIG. 10 is a side view which shows the state of the frame 200 with the seat cushion 2 in the seating posture.
Figure 11:
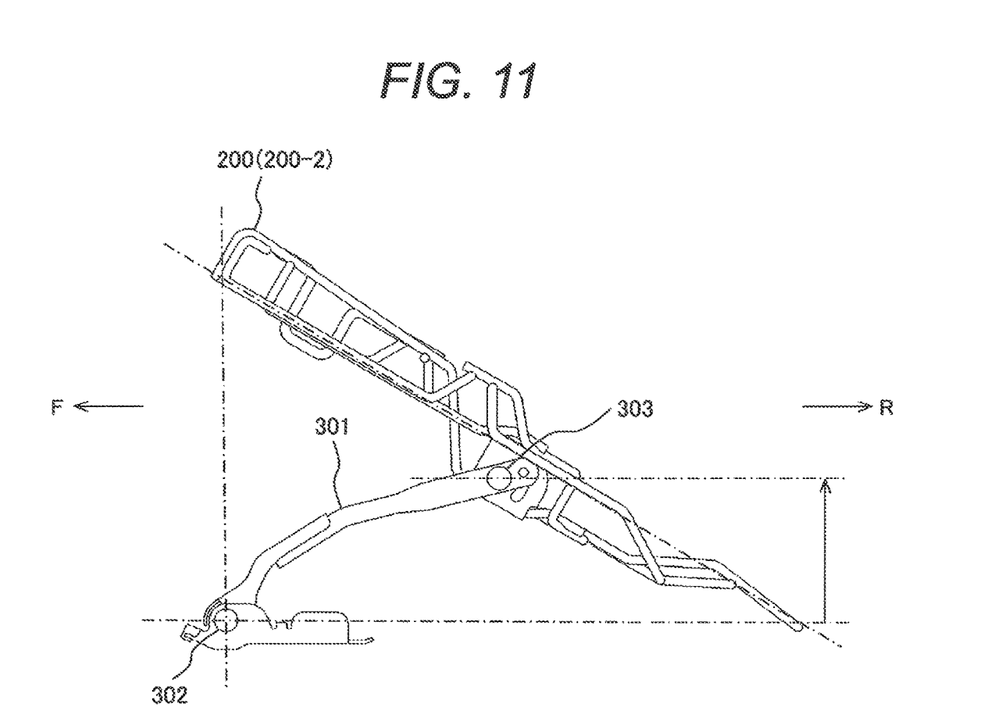
FIG. 11 is a side view which shows the state of the frame 200 with the seat cushion 2 in the flipped-up posture.
Figure 12:
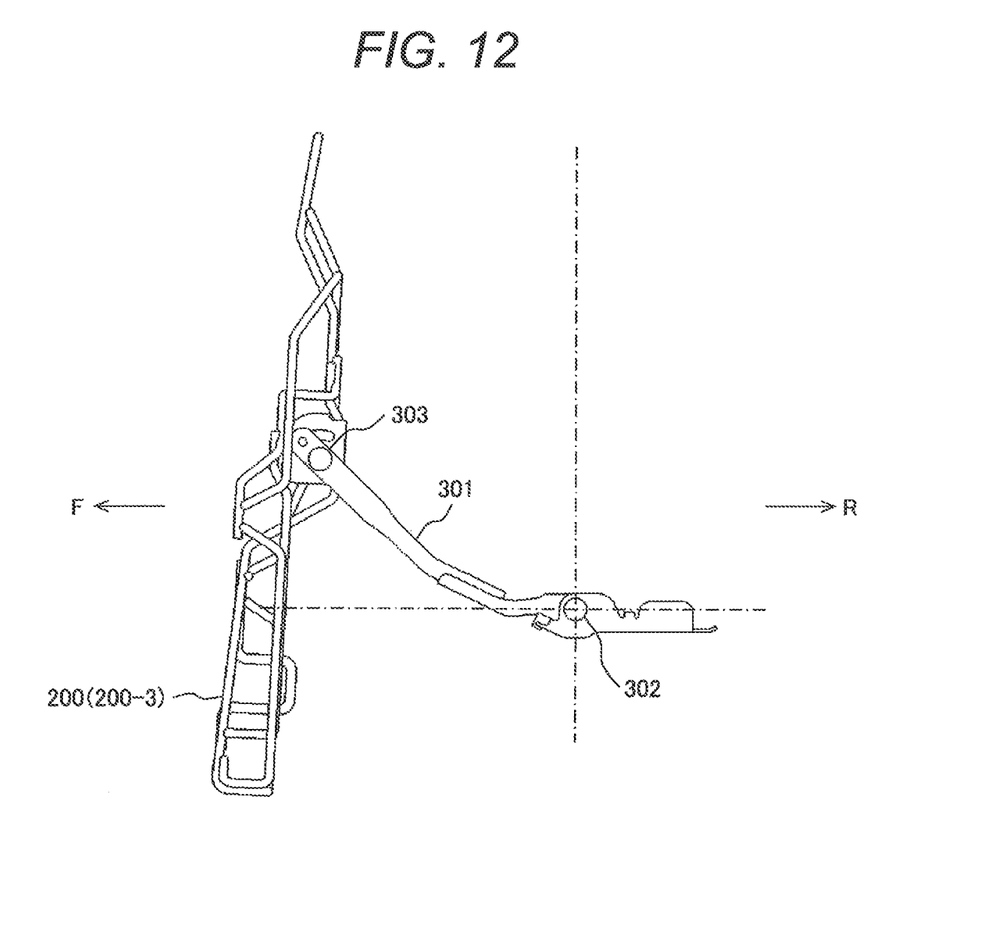
FIG. 12 is a side view which shows the state of the frame 200 with the seat cushion 2 in the escape posture.

The change in the posture of the seat cushion 2 will be summarized referring to FIGS. 10 to 12. FIG. 10 is a side view which shows the state of the frame 200 with the seat cushion 2 in the seating posture. FIG. 11 is a side view which shows the state of the frame 200 with the seat cushion 2 in the flipped-up posture. FIG. 12 is a side view which shows the state of the frame 200 with the seat cushion 2 in the escape posture.

When the seat cushion 2 is in the seating posture 200-1, the rotation shaft 303 of the support leg part 301 is in a lower position than the rotation shaft 302 (FIG. 10).

When the seat cushion 2 is in the flipped-up posture 200-2, the rotation shaft 303 of the support leg part 301 is raised to a higher position than the rotation shaft 302. At this time, the rotation shaft 303 is located behind the rotation shaft 302. As a consequence, the front end of the frame 200 (seat cushion 2) is tilted in a manner that its front end is in a higher position than its rear end (FIG. 11).

In shift from the flipped-up posture 200-2 to the escape posture 200-3, the support leg part 301 rotates the rotation shaft 303 with the rotation shaft 302 as the center so as to move it forward of the rotation shaft 302. As a consequence, in the escape posture 200-3, the rotation shaft 303 is located forward of the rotation shaft 302 and the rotation shaft 303 is in a higher (upper) position than the rotation shaft 302. At this time, the frame 200 (seat cushion 2) is in a state in which the seating surface is almost vertically upright (FIG. 12).

In the present embodiment, the seat cushion 2 can be automatically shifted from the seating posture to the escape posture by operating the operation part 9. Therefore, the user will be no longer puzzled about how to operate and the vehicle seat 1 which is easy to operate can be provided. In the present embodiment, the operation part 9 is operated simply by pulling the operation strap.

In addition, since the rotation shaft 303 is located in a middle portion of the frame 200 in the longitudinal direction and the rotation shaft 302 is located at the front end of the frame 200 (base part 5), shift from the seating posture to the flipped-up posture and further to the escape posture can be performed smoothly.

In addition, in the present embodiment, the elastic member 305 is located under the seating surface of the seat cushion 2 and placed in a gap of the frame member inside the cushion material 7. Therefore, there is no need for a special space for placement of the elastic member 305. Therefore, the flip-up mechanism 300 can be space-saving. In addition, the elastic member 305 is located in the center of the frame 200 where there are little obstacles to assembling work and the elastic member 305 has only to be hooked onto the frame member 202 and the guided member 304. Therefore, work to attach the elastic member 305 is easy and the manufacturing cost can be reduced.

The driving force to drive the flip-up mechanism 300 is obtained by the coil spring 305 and the coil spring 307. Since the flip-up mechanism 300 uses structurally simple and inexpensive coil springs (tension springs), failures such as malfunctioning hardly occur and cost reduction can be achieved.

Since the coil spring 305 which functions during shift from the seating posture to the flipped-up posture and the coil spring 307 which functions during shift from the flipped-up posture to the retracted posture are provided, operation for shift from the seating posture to the flipped-up posture and operation for shift from the flipped-up posture to the retracted posture can be performed properly and stably. In addition, the coil spring 305 and the coil spring 307 can be small. For this reason, the hinge part 306 can be small.

In the present embodiment, when the seat cushion 2 is not locked, at least the front portion is in a raised state (pop-up state), so it is easy to know whether it is locked or unlocked.

As explained above about the vehicle seat in PTL 1, after the seat cushion 2 is set to the escape position, the walk-in operation (walk-in mode) of the walk-in mechanism is required to be cancelled. By cancelling the walk-in operation, the seat back 3 can be turned to the fully tilted-down position and also the upper rail 6b is locked onto the lower rail 6a to restrain the seat 1 from sliding. In the conventional technique, after the seat cushion 2 is set to the escape position, the user has to operate the cancel operation lever to activate the walk-in cancel mechanism to cancel the walk-in operation.

In the vehicle seat 1 in the present embodiment, as shown in FIG. 13, the walk-in cancel mechanism is made to function in conjunction with operation of the operation strap 9. FIG. 13 is a view which illustrates the walk-in cancel mechanism of the vehicle seat 1 according to an embodiment of the present invention. In FIG. 13, only the left base part 5A is shown and the right base part 5B is omitted.

In the present embodiment as well, the base part 5A has a mechanism section 400 which includes a walk-in mechanism, a walk-in cancel mechanism, and a walk-in cancel release mechanism. This mechanism section 400 can be structured in the same manner as in PTL 1.

However, in the present embodiment, operation to set the walk-in operation lever to the walk-in non-operation position (position where no interference with the pressing projection occurs) is performed by a wire 401 connected to the operation strap 9 through a lever 402. In other words, the operation part (operation strap) 9 is connected to the walk-in cancel mechanism of the mechanism section 400 so that the walk-in cancel mechanism of the mechanism section 400 can be operated by the operation part 9.

Consequently, operation to set the walk-in operation lever to the walk-in non-operation position is performed in conjunction with operation of the operation part 9. In other words, operation to cancel walk-in is automatically performed by operating the operation part 9 in order to set the seat cushion 2 to the escape position.

Therefore, in the present embodiment, the user need not manually do operation to set the walk-in operation lever to the walk-in non-operation position. Consequently operation to cancel walk-in can be omitted and the user will be no longer puzzled about how to cancel walk-in.

REFERENCE SIGNS LIST

1 . . . vehicle seat,
2 . . . seat cushion,
5 . . . base part,
5A . . . left base member,
5B . . . right base member,
5a, 5b, 5c . . . connecting member,
6 . . . slide rail device,
6a . . . lower rail,
6b . . . upper rail,
9 . . . operation part,
10a, 10b, 10c . . . bracket,
100 . . . seat cushion lock mechanism,
200 . . . frame,
200-1 . . . frame in the seating posture,
200-2 . . . frame in the flipped-up posture,
200-3 . . . frame in the escape posture,
201 . . . connecting member (connecting plate),
201a . . . guide groove,
202 . . . frame member,
203 . . . striker,
300 . . . flip-up mechanism,
301 . . . support leg part,
302 . . . rotation shaft,
303 . . . rotation shaft,
304 . . . guided member (guided frame member),
305 . . . elastic member,
306 . . . hinge part,
307 . . . coil spring,
401 . . . wire,
402 . . . lever

The invention claimed is:

1. A seat for vehicles having an escape mechanism to shift a seat cushion disposed on a base part from a normal seating posture through a flipped-up posture to an escape posture with the seat cushion placed forward of the base part, the escape mechanism comprising:
   a support leg part having a first end connected to a frame of the seat cushion rotatably around a first rotation shaft and a second end connected to the base part rotatably around a second rotation shaft;
   a guide part to be engaged with the first end of the support leg part to guide the first end so as to lift the first end;
   a first coil spring biasing the support leg part so as to have the first end guided by the guide part and flip up a portion connected with the frame; and
   a second coil spring provided on the second rotation shaft to apply a biasing force so as to rotate the first end of the support leg part forward around the second rotation shaft.

2. The seat for vehicles according to claim 1, wherein in the support leg part, when the seat cushion is in the seating posture, the second end is located on a front side of the base part and the first end extends toward a rear of the base part, and
   the first coil spring is located between the frame and the support leg part so as to bias the first end of the support leg part forward.

3. The seat for vehicles according to claim 2, wherein the first coil spring is located under a seating surface of the seat cushion.

4. The seat for vehicles according to claim 3, further comprising a connecting member being fixed in a middle portion of the frame in a longitudinal direction and having the first rotation shaft and the guide part.

5. The seat for vehicles according to claim 4, wherein when the seat cushion is in the seating posture, the connecting member has the guide part behind the first rotation shaft, and the support leg part has a guided part to be engaged with the guide part, on an opposite side of the second rotation shaft with respect to the portion connected with the frame.

6. The seat for vehicles according to claim 5, wherein the first coil spring is hooked onto the guided part of the support leg part.

* * * * *